Figure 1:
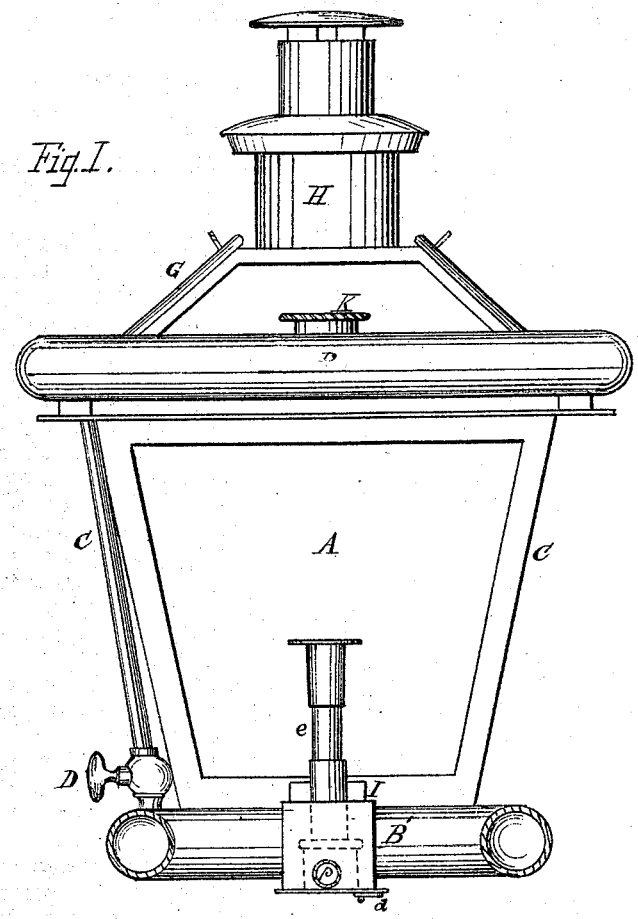
Figure 2:
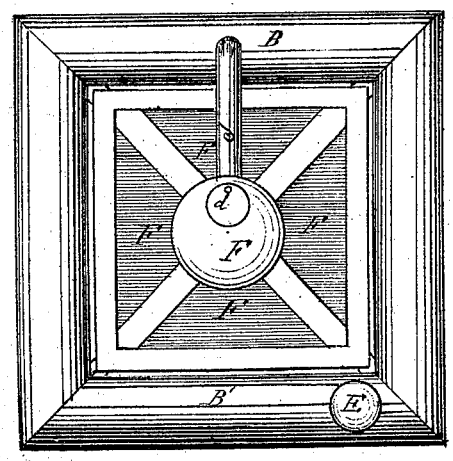

JOHN COOK.
Street Lantern.

No. 124,665.   Patented March 19, 1872.

Witnesses:   Inventor:

124,665

UNITED STATES PATENT OFFICE.

JOHN COOK, OF NEW YORK, N. Y.

IMPROVEMENT IN STREET-LANTERNS.

Specification forming part of Letters Patent No. 124,665, dated March 19, 1872.

*To all whom it may concern:*

Be it known that I, JOHN COOK, of the city, county, and State of New York, have invented certain new and useful Improvements in Lanterns for Illuminating Streets and other public places; and that others skilled in the art may make and use my invention, I make this full, true, and exact description thereof, and of its mode of operation.

Figure No. 1 is a view in elevation and partly in section of a lantern and burner containing my invention.

The general structure and frame of my lantern does not differ from those generally in use for such purposes. I provide my lantern, however, with an upper and a lower reservoir for holding the fluid for the production of the gas before mentioned. The upper reservoir is indicated by the letter B, and the lower one on Fig. No. 2, which represents the lower reservoir, and the bottom of the lantern by the letters B' B'; and I make them of such aggregate capacity that they may contain sufficient for a liberal degree of illumination for some fourteen nights; and I place the upper reservoir above the bulge of the lantern and the lower one below, or nearly below the bottom of the lantern and outside of the lantern, and fixed to it, and without the reach of heat from the flame from the burner, to be attached to a pipe, $p$, from the bottom of the lower reservoir; and I connect the upper reservoir to the lower one by a pipe, C, and provide it with a valve-cock, D, by which to admit and stop the flow of the fluid from the upper to the lower reservoir. There is an opening on the top of the upper reservoir, closed by a cap, K, through which to fill said reservoirs; and when the lower one is filled the fact may be seen through an opening in the top of the lower reservoir, marked I, covered by a piece of glass, at which time the cock is to be turned to stop the further flow of the fluid; and on both the upper and lower sides of the lower reservoir I have made an opening, which is covered by a cap, E, one of which is seen in the drawing, Fig. No. 2, to be used in cleaning said lower reservoir; and the sides and roof of my lantern are to be covered by glass, as is usual in street-lanterns; and instead of tin or glass in the bottom of the lantern, I substitute wire-gauze, marked F in Fig. No. 2; and I attach a pipe to the bottom of the lower reservoir, which pipe is marked by the letter $p$, which I carry to the central part of the bottom of the lantern, when it is turned up and fitted to receive my safety-burner; and the central portion of the bottom of the lantern is separated from the other portion of the bottom, and is also covered with wire-gauze, having a sliding door, $d$, in it, through which a lighter may be put to light the burner, and through which the extinguisher also may be put to extinguish the burner; and to the upper end of the pipe $p$, in the central part of the bottom of the lantern, I attach my safety-burner, which having been fully described in my application for Letters Patent on my lamp and burner for the safe production and combustion of hydrocarbon-vapor gas for illumination, I omit any specific description of it here.

The operation of my invention, while it is partly indicated in the statement of the construction of my lantern and the relation of the burner to the body of the fluid to be converted into hydrocarbon-vapor gas for the illumination of streets and public places, may be more perfectly stated as follows: First, after affixing my said safety-burner to the top of the pipe $p$ and filling the reservoirs with the appropriate fluid, and moving the sliding door in the bottom of the lamp, marked $d$, a lighted lighter may be extended up through said door to the burner, when it will, after a moment's application to the top of the burner, burn, and the wick of the tube of the burner will draw up from below, by capillary attraction, only so much of such fluid as it will convert into a perfect hydrocarbon-vapor gas for illumination, while the provision of the wire-gauze for the bottom of the lamp, while it will admit a moderate flow of exterior air to sustain a perfect combustion, will also prevent the sudden accession of any air, by storms or winds, to extinguish the light from the burner; and the use of the wick, with the mode of lighting set forth, relieves from the necessity of placing the body of the fluid for the production of this gas, for the purpose stated, above the level of the burner, and the consequent necessity of relying upon any metallic valves to admit and stop the flow of the material to the burner; and for the purpose of securing a greater degree of illumination than one burner will afford, two or more may be used without a departure from the principle of my invention.

I do not claim a lantern for the lighting of streets and public places, with a reservoir exterior of such lantern and above the level of the burner used, and relying upon pressure to supply the burner with fluid, for the purpose before mentioned; but

What I claim as new, and for which I seek Letters Patent, is—

1. A lantern, provided with an exterior upper and lower reservoir, connected together by a pipe, with a cock in it, to admit and stop the flow of the fluid from the upper to the lower reservoir, the lower one being provided with means by which to determine when it is filled, and upper and lower apertures by means whereof to clean it, in combination with a pipe from the bottom of the lower one, to which to attach a burner, and the wire-gauze bottom, for the uses and purposes set forth.

JOHN COOK.

Witnesses:
 JNO. B. SCOTT,
 P. J. DUFFY.